United States Patent Office 3,280,066
Patented Oct. 18, 1966

3,280,066
ISOCYANURATE POLYMERS OF TOLYLENE DIISOCYANATE
Harold France, Vincent Kerrigan, and Donald Lees, Manchester, England, assignors to Imperial Chemical Industries Limited, London, England, a corporation of Great Britain
No Drawing. Filed Oct. 15, 1962, Ser. No. 230,687
Claims priority, application Great Britain, Oct. 17, 1961, 37,160/61
5 Claims. (Cl. 260—31.2)

This invention relates to new polymers in particular to new isocyanurate polymers of tolylene diisocyanate.

It is already known to polymerise diisocyanates to polymers having the isocyanurate ring structure, such polymers having a high content of isocyanate groups and a low mean molecular weight.

It has now been found that isocyanurate polymers of tolylene diisocyanate having a content of between 13% and 15% isocyanate groups and containing not more than 1.25% free tolylene diisocyanate, which polymers may be obtained by carrying on the polymerisation to a further extent than heretofore described, are particularly useful polymers for incorporation in the manufacture of polyurethanes particularly polyurethane surface coatings.

According to the present invention there are provided compositions of matter comprising from 98.5% to 100% by weight of a polymerised tolylene diisocyanate and from 0% to 1.5% by weight of unpolymerised tolylene diisocyanate, said polymerised tolylene diisocyanate containing at least one isocyanurate ring per molecule and said composition containing from 13.0% to 15.0% free isocyanate groups by weight.

There are also provided solutions of said compositions in solvents inert towards the isocyanate group and a process for making said solutions.

The isocyanurate polymers of the present invention may be made from any of the isomeric tolylene diisocyanates for example tolylene-2:4-diisocyanate, tolylene-2:6-diisocyanate, tolylene-2:5-diisocyanate or mixtures thereof. Preferred isocyanurate polymers are those made from tolylene-2:4 - diisocyanate, tolylene-2:6 - diisocyanate or mixtures of tolylene diisocyanates.

The isocyanurate polymers of the present invention may be prepared by any of the methods and using any of the catalysts known from the prior art to give isocyanate polymers containing the isocyanurate ring structure. For example the isocyanurate polymer may be prepared by treating the tolylene diisocyanate, either alone or in a suitable solvent with a basic catalyst such as an aliphatic tertiary amine, a basic metallic compound such as an alkali or alkaline earth metal oxide, hydroxide carbonate, alcoholate or phenate, an alkali metal salt of an enolisable compound or a metallic salt of a weak organic carboxylic acid. Co-catalysts may be used, such as for example mono-N-substituted carbamic esters the use of which in conjunction in conjunction with basic metallic compounds forms the subject of our copending application Serial No. 144,832. It is preferred to use as catalysts, metallic salts of weak organic carboxylic acids optionally in the presence of a mono-N-substituted carbamic ester, such catalysts give considerably reduced polymerisation times.

Suitable solvents for use in the preparation of the isocyanurate polymers of the present invention are solvents inert towards isocyanates, and include for example esters such as ethyl acetate, butyl acetate, amyl acetate, diethyl phthalate, the acetate of the monoethyl ether of ethylene glycol, dimethyl phthalate and butyl benzoate, ketones such as methyl isobutyl ketone, chloroform, benzene, toluene, xylene, sulphur dioxide, butyrolactone, monochlorobenzene, o-dichlorobenzene, ethers and petroleum ethers or mixture of such solvents.

The preparation of the isocyanurate polymer may conveniently be carried out by polymerising the tolylene diisocyanate with a suitable catalyst until the desired polymer has been obtained; further polymerisation may then be prevented for example by mechanical removal of insoluble catalysts by filtration or by the inactivation of soluble catalysts by treatment with the calculated amount, or a slight excess thereof, of a strong acid such as anhydrous hydrogen chloride or phosphoric acid. Alternatively the tolylene diisocyanate may be polymerised to a degree such that the required polymer formation has taken place and then after removal or inactivation of catalyst, residual free tolylene diisocyanate may be removed by such processes as extraction, distillation or precipitation of the polymer with a solvent in which the monomeric tolylene diisocyanate is soluble.

The isocyanurate polymers of tolylene diisocyanate of the present invention are useful in the manufacture of polyurethanes by methods described in the prior art, such polyurethanes may be homogeneous or cellular, rigid or elastomeric. They are particularly useful in the manufacture of polyurethane surface coatings and lacquers in that they possess unique technological properties in giving lacquers having a faster drying rate and possessing superior colour retention to lacquers prepared from isocyanurate polymers of a lower mean molecular weight and a higher free tolylene diisocyanate content. The isocyanurate polymers of tolylene diisocyanate of the present invention have the added advantage in that possessing a low free tolylene diisocyanate content they present a low toxic hazard to the user, it being well known that volatile diisocyanates such as tolylene diisocyanate constitute a toxic hazard when used for example in applications involving spraying. Especially attractive products with a particularly low toxic hazard are those containing not more than 0.5% of free tolylene diisocyanate.

The invention is illustrated but not limited by the following examples in which all parts and percentages are by weight unless otherwise stated.

Example 1

A mixture of 300 parts 2:4-tolylene diisocyanate, 450 parts ethyl acetate and 0.5 part phenol is stirred under a dry nitrogen atmosphere with exclusion of moisture. The temperature is raised to 55° C. and 3.2 parts of a solution of calcium naphthenate in white spirit containing 4% calcium is added, after which the temperature is maintained at 55±1° C. for about 13 hours. The catalyst is inactivated by addition of 0.23 part phosphoric acid as a 4% weight/volume solution in ethyl acetate, the resulting pale yellow liquid containing 5.8% isocyanate groups. This product is finally filtered from a little suspended matter to give a clear pale yellow liquid containing 0.2% free tolylene diisocyanate.

The product is a solution in ethyl acetate of an isocyanurate polymer of 2:4-tolylene diisocyanate containing 14.5% isocyanate groups and 0.5% free tolylene diisocyanate.

Example 2

0.6 part of a solution of calcium naphthenate in white spirit containing 4% calcium is added to a mixture of 150 parts 2:4-tolylene diisocyanate and 225 parts ethyl acetate which is stirred under dry nitrogen with exclusion of moisture at 55±1° C. After about 11 hours at this temperature, the isocyanate group content having fallen from 19.3% to about 10.3%, 0.25 part phenol is added and the reaction continued at 55±1° C. for a further 6½ hours. The polymerisation is then terminated by the addition of 0.043 part phosphoric acid as a 4% weight/ volume solution in ethyl acetate, after which stirring is continued for a further hour. The resulting pale yellow solution contains 5.9% isocyanate groups, the free 2:4-tolylene diisocyanate content being 0.4%.

The product is a solution in ethyl acetate of an isocyanurate polymer of tolylene-2:4-diisocyanate containing 14.75% isocyanate groups and 1.0% free tolylene diisocyanate.

Example 3

A mixture of 1200 parts of mixed 2:4/2:6-tolylene-diisocyanate (isomer ratio 80/20), 1800 parts dimethyl phthalate, 2.0 parts of phenol and 8.48 parts of a solution of calcium naphthenate in white spirit containing 4% calcium is stirred under a dry nitrogen atmosphere in the absence of the moisture. (White spirit is a distilled petroleum fraction boiling at approximately 150°–250° C.) The temperature is raised to 70° C. and the mixture maintained at 70°–75° C. for about 22¼ hours by which time the total isocyanate value of the reaction mixture has fallen to 6.25%. The catalyst is inactivated by the addition of .456 part of phosphoric acid as a 4% weight/volume solution in dimethyl phthalate.

On cooling the product, the viscous solution of isocyanurate polymer in dimethyl phthalate obtained is diluted with a further 430 parts of dimethyl phthalate and the mixture exaporated to dryness by passing it through an agitated thin film distillation apparatus at 180° C. and a vacuum of 3 to 5 mm. of mercury.

The white solid powdered residue thus obtained is essentially an isocyanurate polymer of tolylene diisocyanate containing only traces of tolylene diisocycanate and dimethyl phthalate and analyses at 13.34% total isocyanate groups, less than 0.1% free tolylene diisocyanate and 0.1% dimethyl phthalate.

The powder is readily soluble in the usual lacquer ester solvents such as ethyl and butyl acetates to give, at 40% concentrations, light yellow liquids having viscosities at 25° C. of between 2 and 4 poises.

Example 4

A mixture of 300 parts 2:4/2:6-tolylene diisocyanate (isomer ratio 80/20), 450 parts ethyl acetate and 0.5 part phenol is stirred under a nitrogen atmosphere with exclusion of moisture. The temperature is raised to 55° C. and 3.3 parts of a solution of calcium naphthenate in white spirit containing 4% calcium is added, after which the temperature is maintained at 55±1° C., slight exothermicity being evidenced in the early stages of the polymerisation. When the isocyanate group content of the product has fallen to 5.5% this point being reached in about 14 hours, the catalyst is inactivated by addition of 0.24 part phosphoric acid as a 4% weight/volume solution in ethyl acetate. After filtration from a little suspended matter, the clear pale yellow liquid contains 0.4% free tolylene diisocyanate.

The product is a solution in ethyl acetate of an isocyanurate polymer of 2:4/2:6-tolylene diisocyanate containing 13.5% isocyanate groups and 1% free tolylene diisocyanate.

Example 5

150 parts 2:4-tolylene diisocyanate and 225 parts ethyl acetate are successively charged to a reactor previously purged with dry nitrogen. With exclusion of moisture and while maintaining a dry nitrogen atmosphere, the temperature is raised to 55±1° C. when 0.535 part of a solution of calcium naphthenate in white spirit containing 4% calcium is added. After 15 minutes 0.156 part of a solution of lead naphthenate in white spirit containing 24% lead is added and heating continued at 55±1° C. The slightly exothermic reaction which occurs in about ½ hour is easily controlled, after which heating is continued at 55±1° C. Four hours after the addition of the lead catalyst 0.25 part phenol is added and heating continued at 55±1° C. until the isocyanate group content is 5.8%. When this point is reached 0.05 part phosphoric acid as a 4% weight/volume solution in ethyl acetate is added to inactivate the catalyst and heating continued for a further ½ hour. The cold product is a clear pale yellow liquid containing 0.2% free tolylene diisocyanate corresponding to an ethyl acetate solution of an isocyanurate polymer of 2:4-tolylene diisocyanate containing 14.5% isocyanate groups and 0.5% free tolylene diisocyanate.

What we claim is:

1. Composition of matter comprising from 98.5% to 100% by weight of a polymerised tolylene diisocyanate and from 0% to 1.5% by weight of unpolymerised tolylene diisocyanate, said polymerised tolylene diisocyanate containing at least one isocyanurate ring per molecule and said composition containing from 13.0% to 15.0% free isocyanate groups by weight based on the weight of polymerized and unpolymerized tolylene diisocyanate.

2. Composition of matter as claimed in claim 1 wherein the polymerised tolylene diisocyanate is selected from the group consisting of polymerised tolylene-2:4-diisocyanate, polymerised tolylene-2:6-diisocyanate and polymerised mixed tolylene 2:4- and 2:6-diisocyanates and the tolylene diisocyanate is selected from the group consisting of tolylene-2:4-diisocyanate, tolylene-2:6-diisocyanate and mixed tolylene-2:4- and 2:6-diisocyanates.

3. Solutions comprising about 40% composition of matter as claimed in claim 1 and about 60% an organic solvent inert towards the isocyanate group.

4. Solutions as claimed in claim 3 wherein the organic solvent is selected from the group consisting of ethyl acetate, butyl acetate, amyl acetate, diethyl phthalate, dimethyl phthalate and butyl benzoate.

5. Polyurethane surface coatings manufactured from the compositions as claimed in claim 1.

References Cited by the Examiner

UNITED STATES PATENTS

| | | |
|---|---|---|
| 2,952,665 | 9/1960 | Bunge et al. |
| 2,954,365 | 9/1960 | Windemuth et al. |
| 2,978,449 | 4/1961 | France et al. |

MORRIS LIEBMAN, *Primary Examiner.*

L. T. JACOBS, *Assistant Examiner.*